April 14, 1942.   J. W. LOGAN, JR   2,279,433
BRAKE CONTROL DEVICE
Filed March 23, 1939   3 Sheets-Sheet 2

INVENTOR
JOHN W. LOGAN, JR.
BY
ATTORNEY

April 14, 1942.  J. W. LOGAN, JR  2,279,433
BRAKE CONTROL DEVICE
Filed March 23, 1939  3 Sheets-Sheet 3
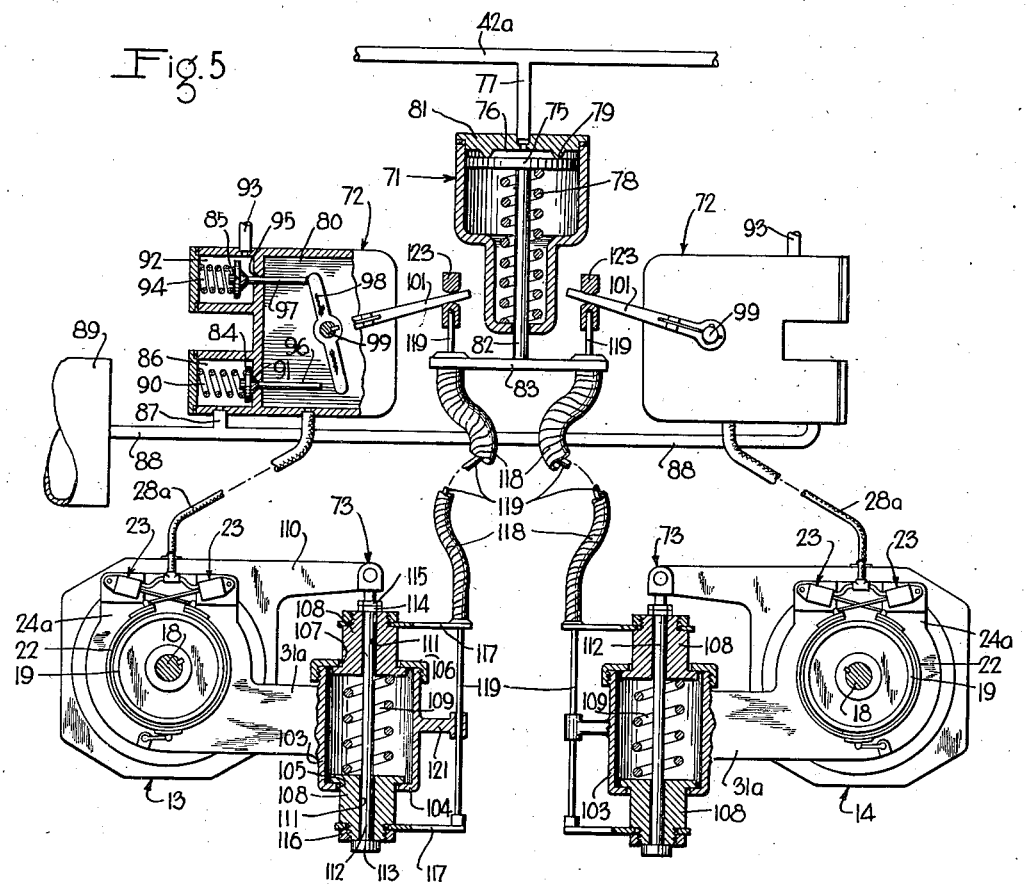
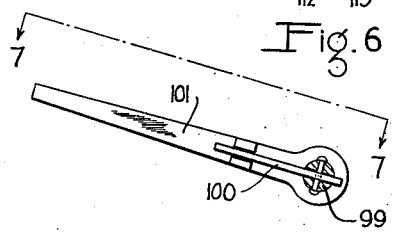
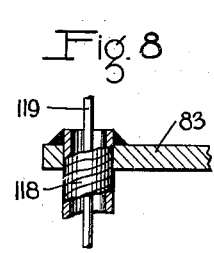
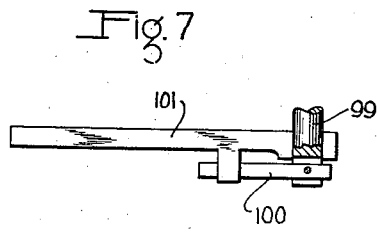
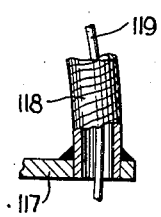
INVENTOR
JOHN W. LOGAN, JR.
BY
ATTORNEY Patented Apr. 14, 1942

2,279,433

UNITED STATES PATENT OFFICE 2,279,433

BRAKE CONTROL DEVICE

John W. Logan, Jr., Forest Hills, Pa., assignor to The Westinghouse Air Brake Company, Wilmerding, Pa., a corporation of Pennsylvania Application March 23, 1939, Serial No. 263,591

9 Claims. (Cl. 303—21)

This invention relates to brake control devices and has particular relation to control apparatus for vehicle wheel brakes including means responsive to the torque exerted on the wheel brakes during application thereof for regulating and controlling the degree of the brake application.

In my prior Patent 2,014,903, there is disclosed and claimed a vehicle wheel brake apparatus including a movable member subject to the torque exerted on the vehicle wheel brakes and a flexible leaf spring which yieldingly permits movement of the torque member only when the torque on the member exceeds a certain uniform value. Movement of the torque member is utilized to so limit the degree of the brake application as to prevent the locking of the vehicle wheels and the consequent sliding thereof under normal conditions of adhesion between the vehicle wheels and the road surface or rails.

In my present invention, I propose to provide a torque responsive mechanism wherein the torque exerted on the wheel brake devices is opposed by a force which varies in correspondence with the desired degree of application of the brakes. By thus varying the force resisting the torque force on the wheel brake devices according to the degree of the desired brake application, it is possible to regulate the degree of brake application on each individual wheel and axle unit to any one of a plurality of different degrees dependent upon the degree of brake application selected, as distinguished from only one given degree as in my prior Patent 2,014,903. Also each wheel and axle unit is automatically braked so as to contribute its proper share of the total braking effort.

It is accordingly an object of my invention to provide brake control apparatus including means responsive to the torque exerted on wheel brake devices for regulating the degree of the brake application on an individual wheel and axle unit to any one of a plurality of different values selected by the operator.

Figure 1:
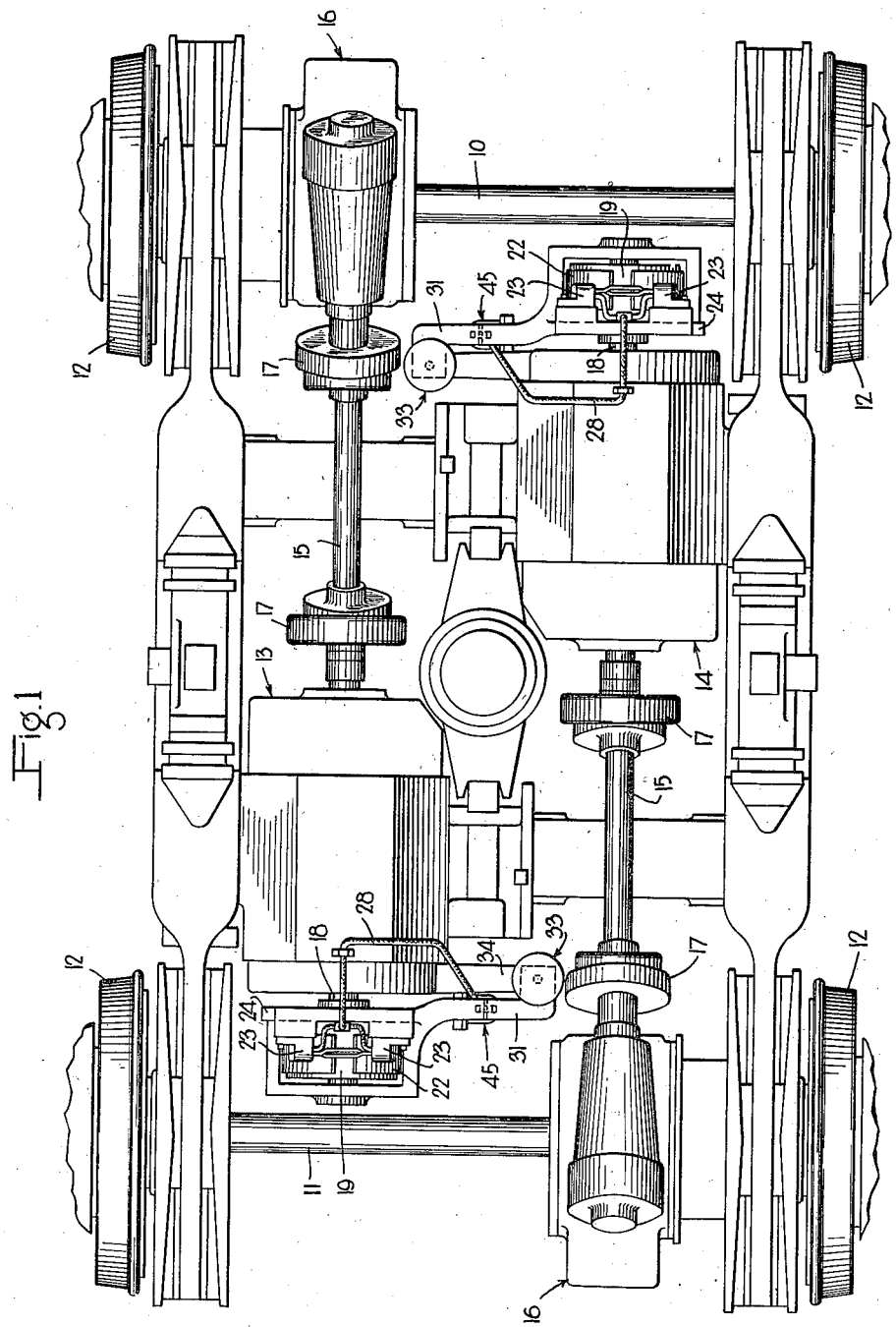
Figure 2:
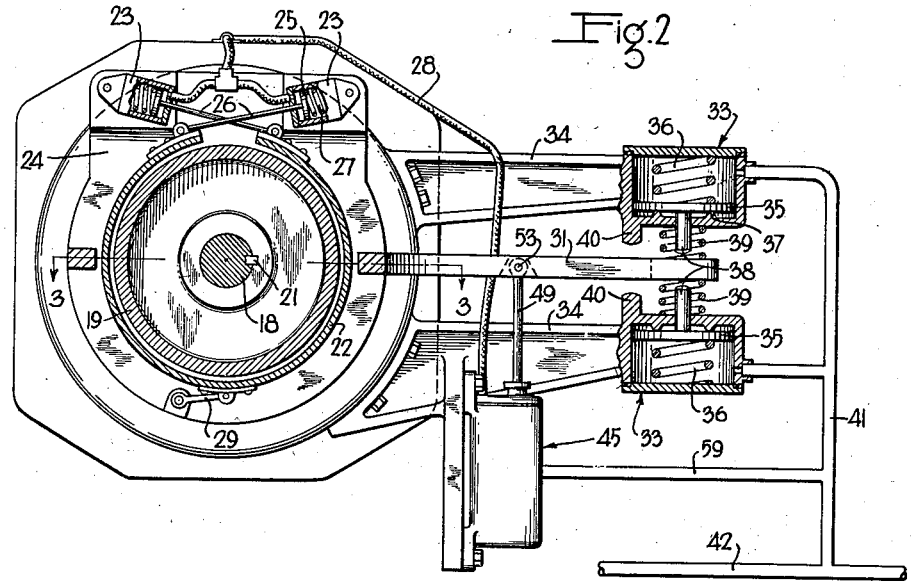
Figure 3:
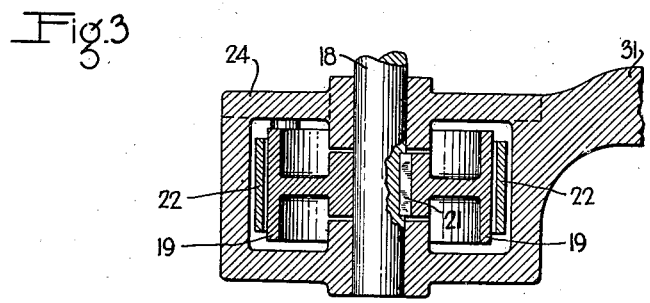
Figure 4:
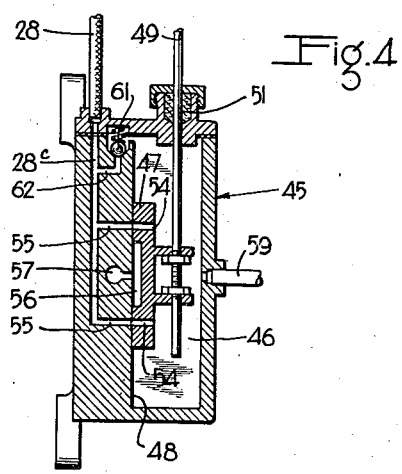

The above object, and other objects of my invention which will be made apparent hereinafter, are obtained by means of several illustrative embodiments of my invention subsequently to be described and shown in the accompanying drawings wherein Fig. 1 is a plan view of a traction vehicle wheel truck, showing the manner of application of my invention thereto, Fig. 2 is a diagrammatic and partly sectional view showing one embodiment of my invention, Fig. 3 is a sectional view, taken on the line 3—3 of Fig. 2, showing further details of construction, Fig. 4 is an enlarged sectional view showing the construction of the slide valve mechanism indicated in outline form in Fig. 2, Fig. 5 is a diagrammatic and partly sectional view showing a second embodiment of my invention, and Figs. 6, 7, 8 and 9 are enlarged views showing details of construction of the embodiment shown in Fig. 5.

Description of equipment

Referring to Fig. 1, a typical four wheel truck is shown having two axles 10 and 11 to which the vehicle wheels 12 are fixed and two traction motors 13 and 14 arranged longitudinally of the wheel truck and adapted to drive the axles 10 and 11 respectively. As will be apparent, the shaft of each vehicle motor 13 and 14 is connected to the corresponding axle through a suitable drive shaft 15 and gear mechanism indicated generally at 16. Where the arrangement is such as to require it, each drive shaft 15 may be coupled to the corresponding motor armature shaft and gear mechanism by suitable universal joint couplings 17 as shown.

As indicated in Fig. 1 generally and more specifically in Figs. 2 and 3, the brake apparatus is suitably mounted and arranged in associated relation with the projecting end of each motor armature shaft so that the braking effect on the vehicle wheels 12 is necessarily effected through the drive shaft 15 and gear mechanism 16.

Since the brake apparatus associated with each of the motors 13 and 14 is substantially identical in structure, only that associated with the motor 13 will be described.

As indicated in Figs. 2 and 3, the projecting end of the motor armature shaft 18 has a brake drum 19 suitably fixed thereon, as by a key 21, and arranged in cooperative surrounding relation to the drum 19 is a brake device illustrated in the form of a circular brake band of suitable nature adapted to be contracted into frictional clamping relation around the peripheral outside surface of the drum 19 upon the supply of fluid under pressure to a pair of suitable operating cylinders 23.

The operating cylinders 23 are mounted in fixed positions respectively on a plate member 24, hereinafter referred to as the torque plate, which is journalled on the motor armature shaft 18.

Each of the cylinders 23 contains a piston 25 having a rod or stem 26 pivotally connected to a corresponding end of the brake band 22. A coil spring 27 contained in each cylinder in interposed relation between one face of the piston 25 and one end of the cylinder normally urges the piston to a brake releasing position wherein the brake band 22 is expanded out of contact with the brake drum 19.

A suitable pipe or conduit 28 is provided which has two branches leading respectively to each of the two operating cylinders 23, through which pipe fluid under pressure may be supplied to the side of the piston 25 opposite the spring 27, to cause movement thereof in a direction to effect contraction of the brake band 22 about the brake drum. It will be apparent that the two cylinders 23 are arranged so as to pull the corresponding ends of the brake band 22 in opposite directions, thus causing the brake band to effectively clasp the brake drum 19 in frictional braking relation.

In order to hold the brake band in a substantially fixed position with respect to the torque plate 24, a link 29 is pivotally connected at opposite ends thereof to the torque plate 24 and the brake band 22 respectively.

Formed integrally with or attached to the torque plate 24 and arranged perpendicular to the motor shaft 18 transversely of the wheel truck is an arm 31, hereinafter referred to as the torque arm.

For the purpose of restraining and controlling the movement of the torque arm 31 in response to the torque force exerted on the torque plate 24 upon contraction of the brake band 22 about the brake drum 19 while the vehicle is in motion, a pair of cylinders 33 are provided on opposite sides of and at the outer end of the torque arm 31. As shown in Fig. 2, the cylinders 33 may be suitably mounted as by brackets 34 secured to the frame of the vehicle motor.

Each cylinder 33 contains a movable abutment, illustrated as a piston 35, which is normally urged in the direction of the torque arm 31 by a coil spring 36, interposed between the cylinder head and one face of the piston 35 so that the piston is seated on an annular rib 37 formed on the head of the cylinder opposite the first mentioned head. The piston 35 has a stem 38 which projects through the head of the cylinder and which is adapted to be engaged at its outer end by the torque arm 31.

Arranged on opposite sides of the torque arm 31 respectively, in interposed relation between the torque arm and the adjacent cylinder head, are a pair of coil springs 39 which serve to center the torque arm 31 in a normal position providing a certain amount of clearance between the torque arm and the outer end of the piston stems 38. The springs 39 are of sufficient strength that, with the brake band 22 in released position, movement of the torque arm 31 incidental to road shock during travel of the vehicle along the road is not transmitted to the pistons 35 in the cylinders 33, thus preventing oscillatory movement of the pistons 35 in the cylinders 33 under normal conditions and the consequent wear on the piston rings (not shown).

Fluid under pressure is introduced into the cylinders 33 through a branch pipe 41 from a pipe 42, hereinafter called the control pipe, which extends longitudinally of a vehicle and, in the case of a train of cars, may extend throughout all cars of the train. Control pipe 42 is normally vented to atmospheric pressure and is charged to a desired fluid pressure corresponding to a desired degree of application of the wheel brakes by suitable means (not shown) under the direct control of the operator or driver of the vehicle. The fluid under pressure introduced into each cylinder 33 exerts a force on the piston 35 in the same direction as that of the coil spring 36 and is thereby adapted to oppose the rotational movement of the torque arm 31 in accordance with the pressure established in the corresponding cylinder 33 and control pipe 42.

In order to limit the maximum displacement of the torque arm 31 in either direction out of its normal position, each of the cylinders 33 may be provided with a suitable lug 40 arranged to be engaged by the arm 31.

Associated with and adapted to be operated by movement of the torque arm 31 is a slide valve mechanism 45, the casing of which may be suitably attached to one of the brackets 34 supporting one of the cylinders 33.

As shown in Fig. 4, the casing of the slide valve mechanism 45 is formed to provide a slide valve chamber 46, and a slide valve 47 contained in chamber 46, cooperates with a suitable slide valve seat 48. Slide valve 47 has an operating rod 49 adjustably fixed thereto at one end, which rod extends through a suitable opening in the end cover of the slide valve casing provided with a packing 51 and has its outer end pivoted, as on a pin 53, to the torque arm.

The slide valve 47 has two spaced ports 54 therein adapted when the torque arm 31 is in its normal centered position, as shown, to register with corresponding spaced ports 55 in the slide valve seat 48 and opening out of a passage 28ᶜ to which the supply conduit 28, leading to the brake operating cylinders 23, is connected.

Formed in the slide valve 47 between the spaced ports 54 is a cavity 56 which is sufficiently long to constantly register with an exhaust port 57 in the slide valve seat 48 for any position of the slide valve 47.

The slide valve chamber 46 is constantly connected, as by a pipe 59 and the branch pipe 41 to the control pipe 42.

A loaded check valve 61, indicated as of the ball type, is provided for preventing the supply of the fluid under pressure from the slide valve chamber 46 to the passage 28ᶜ through a connecting branch passage 62 and is arranged in such a manner as to permit the reverse flow of fluid therepast from the passage 28ᶜ to the chamber 46 to enable the release of fluid from the operating cylinders 23 independently of the position of the slide valve 47.

*Operation*

Assuming that the vehicle or train is being driven under power or coasting and the brakes are released, the control pipe 42 is at atmospheric pressure and the torque arm 31 in its normal centered position. If it is desired to effect application of the brakes, the operator first cuts off the propulsion power, if the power is on, and then causes the control pipe 42 to be charged to a fluid pressure corresponding to the desired degree of application of the brakes.

Fluid under pressure is accordingly supplied from the control pipe 42 to the two cylinders 33, the pistons 35 of which are accordingly held seated on the annular rib 37 associated therewith with a force corresponding to the degree of pressure established in the control pipe. At the same time, fluid under pressure is supplied through the branch pipes 41 and 59 to the slide valve chamber 46 of the slide valve mechanism 45 whence it flows to the operating cylinders 23 of the brake device associated with the armature shaft of the motor by way of the ports 54 in the slide valve 47, ports 55 in the slide valve seat 48, passage 28° and pipe 28. It will be understood that the operation of the brakes associated with the different motors 13 and 14 and axles 10 and 11 is identical so that description of the operation for only one motor and axle should suffice.

Upon the supply of fluid under pressure to the operating cylinders 23, the brake band 22 is correspondingly contracted in clasping relation around the brake drum 19 to effect an application of the brakes on the corresponding vehicle wheels 12.

Assuming that the rotation of the vehicle wheels is such that the armature shaft of the associated driving motor rotates in a counter-clockwise direction as seen in Fig. 2, the torque force exerted on the torque plate 24 and torque arm 31 due to application of the brakes tends to displace or shift the torque plate and arm in a counter-clockwise direction. The centering springs 39 offer only slight resistance to the movement of the torque arm 31 since their primary purpose is merely to center the torque arm in its normal position. Accordingly, the torque arm 31 is promptly shifted into contact with the outer end of the piston stem 38 of the upper cylinder 33, whereupon further movement in a counter-clockwise direction is resisted by the fluid pressure force exerted on the piston 35 of the cylinder and the force of the spring 36 acting on the same piston.

The operating cylinders 23 for contracting the brake band 22 about the brake drum 19 are so designed that the torque force exerted at the end of the torque arm 31 against the piston stem 38 for a given control pressure in the operating cylinders 23 is greater than the opposing force exerted by the given fluid pressure in cylinder 33. Thus, when the pressure in the operating cylinders 23 of the brake device approaches the pressure established in the control pipe 42, the torque force exerted by the torque arm 31 overcomes the opposing force exerted on the piston 35 and consequently the torque arm moves in a counter-clockwise direction out of its normal position.

Due to the fact that the torque force on the torque arm continues to increase as long as the ports 54 in the slide valve 47 register with the ports 55 in the slide valve seat 48, the torque arm 31 will continue to move in a counter-clockwise direction until such time as the slide valve 47 is shifted upwardly sufficient to cut off or lap the ports 55. When this occurs, the further supply of fluid under pressure to the brake operating cylinder 23 is cut off and further counter-clockwise movement of the torque arm 31 in a counter-clockwise direction ceases.

If the coefficient of friction between the brake band 22 and the brake drum 19 remains substantially constant for all speeds of rotation of the vehicle wheels, there will be substantially no further variation in torque force on the torque arm 31 and consequently the slide valve 47 will remain in its lap position maintaining a substantially constant pressure in the brake cylinder 23. With a substantially constant coefficient of friction between the brake band and the brake drum 19, and a constant operating pressure in the brake cylinder 23, the braking effort on the motor shaft 18 and the connected vehicle wheel 12 will remain substantially constant throughout the application of the brakes.

If the coefficient of friction between the brake band and the brake drum 19 varies with the speed of rotation of the vehicle wheels, the torque force on the torque arm 31 will correspondingly vary and shift the arm further in a counter-clockwise direction or backwardly in a clockwise direction toward its normal position depending upon whether the coefficient of friction increases or decreases with reducing speed of rotation of the vehicle wheels.

If the arm 31 tends to be displaced further in a counter-clockwise direction out of its normal position, slide valve 47 will be shifted upwardly out of its lap position, until arm 31 engages the stop lug 40 on the upper cylinder 33, in which position the upper port 55 in the slide valve seat will be connected by the cavity 56 in the slide valve 47 to the exhaust port 57, thus locally venting fluid under pressure from the brake cylinders 23 until such time as the torque force on the torque arm 31 is reduced sufficiently to permit the torque arm to be returned toward its normal position to restore the slide valve 47 to its lap position.

If the torque on the torque arm 31 reduces due to a reduction of the coefficient of friction between the brake band 22 and the brake drums 19 with reducing speed of rotation of the vehicle wheels, the slide valve 47 will move out of lap position downwardly until the ports 54 in the slide valve partially register with the ports 55 in the slide valve seat 48, in which case fluid under pressure will be again supplied to the brake cylinders 23 to further increase the pressure therein. Upon such increase of the pressure in the brake cylinders 23, the torque on the torque arm 31 will correspondingly increase until the slide valve 47 is shifted upwardly sufficiently to lap the supply of fluid under pressure to the brake cylinders.

Thus, whether the coefficient of friction between the brake band 22 and brake drum 19 is substantially constant, increases, or decreases with variations in the rotative speed of the vehicle wheels, the torque mechanism is automatically effective to regulate the pressure in the brake operating cylinders to a value balancing the control pressure in the cylinder 33. Accordingly, if the pressure established in the control pipe 42 is high, then the torque control mechanism automatically regulates the braking force on the vehicle wheels to a correspondingly high value and if the pressure established in the control pipe 42 is relatively low then the torque control mechanism automatically regulates the braking force on the vehicle wheels to a correspondingly low value.

It will be apparent that the control exercised by the torque responsive mechanism automatically compensates for differences in the coefficient of friction between the brake band and brake drum of different brake units by regulating the fluid pressure in the corresponding brake operating cylinders to a value resulting in a substantially uniform torque on the corresponding torque arm. Thus each brake unit is automatically caused to contribute its proper share of braking effort for a given degree of application of the brakes.

If the direction of rotation of the vehicle wheels is such that due to the application of the brakes, the torque force exerted on the torque plate 24 and arm 31 displaces the arm 31 in a clockwise direction, then of course the lower cylinder 33 is effective to oppose the displacement of the arm out of its normal position. In such case, the slide valve 47 of the slide valve mechanism is shifted downwardly with respect to its normal position and the exhaust of fluid under pressure from the brake operating cylinders 23 is effected by the cavity 56 in the slide valve 47 connecting the lower port 55 in the slide valve seat 48 to the exhaust port 57 with the torque arm 31 engaging the stop lug 40 on the lower cylinder 33.

When the vehicle has been brought to a stop due to the application of the brakes, the torque arm 31 remains displaced, due to the frictional force exerted by the brake band 22 on the drum 19, thus holding the slide valve 47 in lap position holding the brakes applied. If the operator desires to release the brakes prior to again starting the vehicle, he may effect the release of the brakes by merely reducing the pressure in the control pipe 42 to atmospheric pressure. Fluid under pressure is thus released from the brake operating cylinders 23 by flow past the check valve 61 to the slide valve chamber 46 and thence by way of the control pipe 42 independently of the position of the slide valve 47. When the pressure in the cylinders 23 is reduced sufficiently, the frictional force holding torque arm 31 displaced is removed and the torque arm is accordingly restored to its normal centered position, thereby restoring slide valve 47 to its normal position.

It should be understood that if an operator desires to vary the degree of a brake application from that initially selected, he may do so by correspondingly increasing or decreasing the pressure in control pipe 42, in which case the torque apparatus automatically adjusts and regulates the pressure in the brake cylinders 23 to a pressure corresponding to the control pipe pressure.

In the application of my invention to a brake equipment for a train of cars, it will be apparent that the control pipe 42 may extend throughout all cars of the train so that variations of pressure in the control pipe 42 will control the brakes associated with all the brake units on all of the cars. It is not necessary however that the control pipe 42 extend throughout all of the cars, it being essential only that the pressure in the control pipe 42 on each car of a train be controlled uniformly and in synchronism by any suitable means for accomplishing such purpose.

It should be understood moreover that while I have illustrated the torque responsive mechanism as associated with the armature shaft of propulsion motors, it may be applied directly to a vehicle wheel or axle.

*Embodiment shown in Figs. 5 to 9*

Referring to Fig. 5, the second embodiment of my invention comprises a common control cylinder 71 subject to the pressure in a control pipe 42a, corresponding to the control pipe 42 of Fig. 2, for regulating and controlling the degree of braking effort exerted by the brake devices associated with a plurality of wheel and axle units, shown for purposes of illustration as two in number.

The control equipment for each individual wheel and axle unit subject to the control of the cylinder 71 is identical in construction and accordingly it is deemed necessary to describe the equipment for only one wheel and axle unit, which will be taken as that associated with the motor 13.

The control equipment for each wheel and axle unit may comprise a control valve 72, similar to an engineman's straight-air valve, for controlling the supply and release of fluid under pressure to and from the operating cylinder 23, the operation of which is under the joint control of the control cylinder 71 and a torque responsive mechanism 73 associated with the motor 13.

The control cylinder 71 contains a movable abutment, illustrated as a piston 75, which has formed at one side thereof a piston chamber 76 that is constantly connected to the control pipe 42a by a branch pipe 77. Interposed between the opposite side of piston 75 and the corresponding end of the cylinder 71 is a calibrated coil spring 78 which normally urges the piston upwardly into seated relation on an annular rib seat 79 formed on the upper end cover or cylinder head 81.

The piston 75 has a stem 82 which extends slidably through a suitable opening in the lower end of the cylinder and carries on the outer end thereof a cross-head member 83. The spring 78 is so calibrated that downward movement of the piston and the cross-head member 83 from the normal position thereof is substantially proportional to the pressure established in the control pipe 42a.

The control valve mechanism 72 may comprise a casing having a so-called pressure chamber 80 formed therein, which is constantly connected to the brake operating cylinders 23 through a pipe or conduit 28a, and a pair of valves 84 and 85, hereinafter referred to as the supply valve and the release valve respectively, for controlling the supply of fluid under pressure to the chamber 80 and the release of fluid under pressure from the chamber. As shown in Fig. 5, the supply valve 84 is contained in a chamber 86 which is constantly connected through a branch pipe 87 and a supply pipe 88 to a reservoir 89 local to the vehicle and adapted to be charged with fluid under pressure in any suitable manner. The supply valve 84 is normally yieldingly urged into seated position on a suitable valve seat to close a port 91 connecting the chamber 86 to the pressure chamber 80.

The release valve 85 is contained in a chamber 92, which is constantly open to atmosphere through an exhaust port 93, and is yieldingly urged toward a suitable valve seat by a coil spring 94 to close a port 95 connecting the chamber 92 to the pressure chamber 80.

The supply and release valves 84 and 85 have operating stems 96 and 97, respectively, which extend through the corresponding ports 91 and 95 into the pressure chamber 80 where they are adapted to be engaged by opposite ends respectively of a lever 98 that is fixed at a point midway between the ends thereof to a rotary pin or shaft 99 journalled in the casing.

One end of the shaft 99 extends through a suitable opening in the side wall of the casing, which opening may be sealed against leakage of fluid under pressure therethrough along shaft 93 from chamber 80, and an operating arm or handle 101 is yieldingly attached to the end thereof outside the casing by a leaf spring 100 in a manner shown in Figs. 6 and 7 to cause rotation of the shaft 99. The handle 101 is normally in a position to cause the supply valve 84 to be seated and the release valve 85 to be unseated. When the handle is rotated out of its normal position, the release valve 85 and the supply valve 84 are successively closed and opened, the degree of opening of the supply valve depending upon the degree of displacement of the operating handle 101 out of its normal position. If handle 101 is operated out of its normal position beyond the maximum opening of supply valve 96, leaf spring 100 yields to permit movement of the handle without movement of lever 98.

The torque responsive mechanism 73 comprises a torque plate 24a and a torque arm 31a, corresponding respectively to the torque plate and torque arm shown in Fig. 2, and a tubular casing 103 formed on or attached to the outer end of the torque arm 31a.

The tubular casing 103 is provided at one end thereof with an inwardly extending flange 104 having a central opening 105, the opposite end being externally threaded to receive a screw collar 106 having a central opening 107 therein.

A pair of flanged bushings 108 are provided which extend respectively through the openings 105 and 107 and which are urged in opposite directions by a coil spring 109 interposed therebetween within the tubular casing 103, the flange on the two bushings engaging the flange 104 and the collar 106 respectively to limit the outward movement of the bushings.

The bushings 108 are provided with central bores 111 arranged in vertical alignment for slidably receiving a tie rod 112 that is pivotally secured at its upper end to a fixed part of the vehicle truck frame, such as an arm 110 fixed to the frame of the motor 13. The tie rod 112 is provided at its lower end with a suitable head 113, which is engaged by the outer end of the lower bushing 108, and is threaded on the upper end thereof to receive a suitable nut 114 and lock nut 115 adapted to be engaged by the outer end of the upper bushing 108.

Secured to each bushing 108, as by a nut 116 screwed on the outer threaded end of each bushing, is a transversely extending strap 117 of rigid construction.

A Bowden wire having an outer flexible armored sheath 118 and an inner flexible wire 119 is provided, the one end of the armored sheath 118 being suitably attached to the upper strap 117, as by welding in the manner indicated in Fig. 9, and the opposite end of the sheath being secured, as by welding, to the cross-head member 83 of the cylinder 71 in the manner indicated in Fig. 8. The flexible wire 119 within the sheath 118 extends downwardly from the lower end of the sheath 118 through a suitable guide lug 121, integrally formed or attached to the tubular casing 103, and has the end thereof attached to the strap 117 on the lower bushing 108. The opposite end of the flexible wire 119 projects out of the end of the armored sheath secured to the cross-head member 83 and has a yoke 123 attached thereto for receiving the outer end of the operating handle or arm 101 of the control valve mechanism 72, to effect rotary movement thereof in one direction away from its normal position and in the opposite direction back toward its normal position.

*Operation of embodiment shown in Fig. 5*

Let it be assumed that the vehicle is traveling along the road or track, either under power or coasting, and that the operator desires to effect application of the brakes. To do so, the operator first cuts off propulsion power, if the power is on, and then causes the control pipe 42a to be charged with fluid at a desired pressure in the manner indicated in connection with the first embodiment. The cross-head member 83 is correspondingly shifted downwardly an amount corresponding to the pressure established in the control pipe 42a and the connected piston chamber 76 of cylinder 71. Since the ends of the armored sheath 118 and of the flexible wire 119 opposite to those fixed to the cross-head member 83 and the yoke 123, respectively, are held in fixed positions by the respective straps 117 of the torque mechanism 73, the downward movement of the cross-head member 83 will correspondingly pull the flexible wire 119 downwardly so as to rotate the operating handle 101 on each of the control valve mechanisms 72 in a corresponding direction.

Upon the shifting of the operating handle 101 of the control valve mechanism 72 in the manner just described, the exhaust valve 85 is first seated to cut off the exhaust communication from the pressure chamber 80 to the exhaust port 93 and thereafter, as the displacement of the operating handle 101 out of its normal position continues, the supply valve 84 is unseated and fluid under pressure is accordingly supplied from the reservoir 89 to the pressure chamber 80 of each of the control valve mechanisms 72 and thence to the respective brake cylinders 23 of the corresponding wheel and axle units. If the degree of downward movement of the cross-head 83 exceeds that required to open supply valve 84 a maximum degree, leaf spring 100 yields to permit the rotary movement of handle 101 relative to the rotary shaft 90.

As the pressure in the brake cylinders 23 increases, the torque exerted on each torque arm 31a is yieldingly resisted by the associated coil springs 109 for either direction of displacement of the torque arm out of its normal position. Assuming that the torque arm 31a associated with motor 13 shifts in a counter-clockwise direction as seen in Fig. 5, the tubular casing 103 slides upwardly relative to the upper bushing 108, which is held against movement by engagement with the nut 114 on the tie rod 112 that is in turn held in a fixed position due to its connection to the motor frame, while the lower bushing 108 is shifted upwardly, with the casing 103, on the tie rod to effect a corresponding movement of the flexible wire 119 longitudinally through the armored sheath 118 to shift the yoke 123 away from the cross-head 83. The operating handle 101 of each control valve mechanism 72 is accordingly shifted backwardly toward its normal position until the supply valve 84 is reseated to cut off the further supply of fluid under pressure to the brake cylinders 23.

Just as in the case of the first embodiment, if the coefficient of friction between the brake band 22 and the brake drum 19 remains substantially constant throughout the brake application without any variation due to variations in the rotative speed of the vehicle wheels, the control valve mechanism 72 remains thereafter conditioned, as described, in a lap position so that the brakes continue to be applied at the degree corresponding to the pressure established in the control pipe 42a.

On the other hand, if the coefficient of friction between the brake band 22 and brake drum 19 increases or decreases during the application of the brakes, the torque arm 31a will be correspondingly shifted further away from its normal position or back toward its normal position respectively. In the event of an increase in the coefficient of friction between the brake band and the brake drum, the increased displacement of the torque arm 31a will result in a further shifting of the operating handle 101 of the control valve mechanism back toward the normal position thereof, and the release valve 85 will accordingly be unseated to release fluid under pressure from the brake cylinders 23. Such release of fluid under pressure will continue until the torque on the torque arm 31a correspondingly reduces to effect the return of the release valve to seated position.

In the event that the coefficient of friction between the brake band and brake drum decreases as the speed of rotation of the vehicle wheels decreases, the consequent reduction of the torque on the torque arm 31a will effect the unseating of the supply valve 84. In such case fluid under pressure will be supplied to increase the pressure in the brake cylinders 23 until such time as the torque on the torque arm 31a is again increased sufficiently to reseat the supply valve 84.

It will thus be apparent that each torque mechanism 73 functions automatically to effect operation of the control valve mechanism 72 corresponding thereto to so adjust and regulate the pressure in the brake cylinders 23 of the associated brake device as to maintain a substantially constant braking effort corresponding to the pressure established in the control pipe 42a.

If the operator desires to vary the degree of application of the brakes from that initially selected, he may do so by correspondingly increasing or decreasing the pressure in the control pipe 42a and the torque mechanism 73 will correspondingly respond to adjust and regulate the pressure in the brake cylinders 23 to a value corresponding to the pressure established in the pipe 42a.

If the direction of rotation of the vehicle wheels is such that the torque arm 31a associated with motor 13 is displaced in a clockwise direction as seen in Fig. 5, the lower bushing 108 of the torque mechanism 73 is held stationary by the tie rod 112 while the upper bushing 108 is moved downwardly with the tubular casing 103 toward the lower bushing, so that the same movement of the flexible wire 119 with respect to the armored sheath 118 is obtained as in the previous case, the ultimate result being to effect operation of the control valve 72 to vent fluid under pressure from the brake operating cylinders 23 and then lap such exhaust.

It will be seen that any desired number of control valves 72 may be operated and controlled by the cross-head member 83 of the cylinder 71, only two valves being shown for purposes of illustration.

When the vehicle comes to a complete stop, the torque arm 31a is maintained in its displaced position by the frictional force between the brake band 22 and drum 19 against the force of spring 109. Consequently the control valves 72 remain in lap position and the brakes remain applied until released as presently to be described. If the operator desires to increase the degree of application while the vehicle is stopped, he may increase the pressure in control pipe 42a to cause unseating of supply valve 84 of the control valves 72, in which case the maximum pressure in reservoir 89 is established in the brake operating cylinders 23 because the torque mechanism 73 is not then operative to restore the supply valve to seated position.

When the operator desires to release the brakes prior to again starting the vehicle, he merely causes the pressure in the control pipe 42a to be reduced to its normal atmospheric pressure. The spring 78 of the cylinder 71 accordingly restores the piston 75 and cross-head 83 to their normal positions shown, in which the control valves 72 are operated to completely release fluid under pressure from the brake operating cylinders 23 and thus completely release the brakes.

It will be appreciated that by providing a single spring, namely the spring 109, in torque mechanism 73 for resisting the movement of the torque arm 31a in either direction of movement from its normal position, a uniform displacement of the torque arm for a given torque force thereon in either direction is obtained. It will also be appreciated that by providing a flexible conduit 28a for supplying fluid under pressure to the brake operating cylinders 23, the brake control equipment including the control valves 72 and the control cylinder 71 may be mounted on the vehicle body or frame instead of the vehicle wheel truck, the Bowden wire including the flexible armored sheath 118 and the flexible wire 119 permitting a suitable connection between the cross-head 83 of the cylinder 71 and the torque mechanism 73.

The principle of operation inherent in this invention whereby the application of the brakes is regulated, through means responsive to the torque exerted on the brake means during an application of the brakes, to any one of a plurality of degrees selected in accordance with a variable control fluid pressure is more broadly claimed in the copending application Serial No. 292,831 of Burton S. Aikman, filed August 31, 1939, and assigned to the assignee of this application.

While I have shown only two embodiments of my invention, it will be apparent that various omissions, additions or modifications may be made therein without departing from the spirit of my invention. It is accordingly not my intention to limit the scope of my invention except as required by the scope of the prior art.

Having now described my invention, what I claim as new and desire to secure by Letters Patent is:

1. Vehicle brake equipment comprising, in combination, fluid pressure operated brake means for exerting a braking force on a vehicle wheel, means movably responsive to the torque exerted on the brake means during an application thereof, a control pipe chargeable with fluid at different pressures corresponding to a selected degree of application of the brake means, a movable abutment subject to the pressure established in said control pipe and arranged in a manner so that the fluid pressure force acting thereon opposes displacement of the said torque responsive means out of a given normal position thereof, and valve means having an operating member connected to said torque responsive means, said valve means being normally conditioned to establish communication through which fluid under pressure is supplied from said control pipe to the fluid pressure operated means and adapted to be operated upon an increasing displacement of the torque responsive means out of its normal position to successively cut off the supply of fluid under pressure to the fluid pressure operated brake means and release fluid under pressure therefrom, whereby to control the operating pressure of the fluid pressure operated brake means so as to cause the brake means to exert a substantially constant braking force corresponding to the degree of pressure established in the said control pipe.

2. Vehicle brake equipment comprising, in combination, fluid pressure operated brake means for exerting a braking force on a vehicle wheel, means movably responsive to the torque exerted on the brake means during an application thereof, a control pipe chargeable with fluid at different pressures corresponding to a selected degree of application of the brake means, a movable abutment subject to the pressure established in said control pipe and arranged in a manner so that the fluid pressure force acting thereon opposes displacement of the said torque responsive means out of a given normal position thereof, valve means having an operating member connected to said torque responsive means, said valve means being normally conditioned to establish communication through which fluid under pressure is supplied from said control pipe to the fluid pressure operated means and adapted to be operated upon an increasing displacement of the torque responsive means out of its normal position to successively cut off the supply of fluid under pressure to the fluid pressure operated brake means and release fluid under pressure therefrom, whereby to control the operating pressure of the fluid pressure operated brake means so as to cause the brake means to exert a substantially constant braking force corresponding to the degree of pressure established in the said control pipe, and check valve means arranged to prevent the supply of fluid under pressure from said pipe to said fluid pressure operated brake means and adapted to permit the release of fluid under pressure from the fluid pressure operated brake means upon a reduction of pressure in the control pipe independently of said valve means.

3. Vehicle brake equipment comprising, in combination, fluid pressure operated brake means for exerting a braking force on a vehicle wheel, valve means having an operating element and adapted in a normal position of the operating element to exhaust fluid under presure from the fluid pressure operated brake means and effective upon movement of the operating element in one direction out of its normal position to successively close the communication through which fluid is exhausted from the fluid pressure operated brake means and open a communication through which fluid under pressure is supplied to the fluid pressure operated brake means, means for moving said operating element in said one direction out of its normal position an amount corresponding to a selected degree of application of the brake means, and means responsive to the torque exerted on the brake means for reversely moving the said operating element to cause said valve means to successively close the communication through which fluid under pressure is supplied to the fluid pressure brake means and open the exhaust communication, whereby the said valve means controls the operating pressure of the fluid pressure brake means so that the brake means exerts a braking force of substantially constant value corresponding to the selected degree of application of the brakes.

4. A vehicle brake equipment comprising, in combination, fluid pressure operated brake means for exerting a braking force on a vehicle wheel, valve means variously conditionable so as to exhaust fluid under pressure from the fluid pressure operated brake means, supply fluid under pressure thereto and lap the supply of fluid under pressure thereto respectively, an operating element for said valve means effective in its normal position to condition the valve means to exhaust fluid under pressure from the fluid pressure operated brake means and movable in one direction to cause the valve means to be conditioned successively to lap the supply of fluid under pressure in the brake cylinder and to supply fluid under pressure to the fluid pressure brake means and upon reverse movement toward its normal position to cause the valve means to successively lap the supply of fluid under pressure to the fluid pressure operated brake means and to exhaust fluid under pressure therefrom, a control pipe chargeable with fluid at different pressures corresponding to a selected degree of application of the brake means, fluid pressure responsive means subject to the pressure in the said control pipe and movable different degrees out of a normal position according to the degree of pressure established in said pipe for effecting operation of the operating element of said valve means in said one direction a corresponding amount, and means responsive to the torque exerted on the fluid pressure operated brake means for effecting reverse movement of said operating element of the valve means while said fluid pressure responsive means remains in its displaced position out of its normal position whereby to cause the valve means to regulate the operating pressure of the fluid pressure operated brake means to cause the brake means to effect a braking force corresponding substantially to the degree of pressure established in said pipe.

5. Brake control equipment for a plurality of vehicle wheel and axle units, comprising fluid pressure operated brake means for each of said units, an individual valve means for each of said units for controlling the supply of fluid under pressure to and the release of fluid under pressure from the fluid pressure operated brake means corresponding thereto, each of said valve means having an operating element adapted when shifted in one direction to cause fluid under pressure to be supplied to the fluid pressure operated brake means and when shifted in the opposite direction to successively cut off the supply of fluid under pressure to the fluid pressure brake means and release fluid under pressure therefrom, a control pipe chargeable with fluid at different pressures corresponding to a selected degree of application of the brakes, a single fluid pressure responsive means subject to the pressure in said pipe and shiftable out of a normal position thereof different degrees according to the pressure established in said pipe to correspondingly effect operation of the operating elements of all of said valve means in said one direction, and means for each of said units responsive to the torque exerted on the corresponding brake means for effecting reverse movement of the operating element of the corresponding valve means whereby said valve means controls the operating pressure of each fluid pressure brake means so that the brake means exerts a substantially constant braking force corresponding to the degree of displacement of the fluid pressure responsive means out of its normal position.

6. In combination, a rotary element, brake means for exerting a braking force on said rotary element, means subject to the torque exerted on the brake means and shiftable in opposite directions out of a normal position thereof for opposite directions of rotation of said rotary element, a Bowden wire having an outer flexible sheath and an inner flexible wire extending longitudinally through and movable longitudinally with respect to said sheath, means for moving said sheath and wire together in one direction out of a normal position an amount corresponding to a selected degree of application of the brakes, and means adapted to cause movement only of the said flexible wire of the said Bowden wire always in a direction opposite to said one direction upon an increasing displacement of the torque responsive means out of its normal position whether in one direction or the other out of its normal position, and means controlled according to the movement of the flexible wire for controlling the brake means.

7. In combination, a rotary element, brake means for exerting a braking force on said rotary element, means subject to the torque exerted on said brake means and shiftable in one direction or the other out of a normal position depending upon the direction of rotation of the rotary element, a pair of members spaced apart, a coil spring interposed between said pair of members and urging them apart, means for preventing movement of said members except toward each other in a direction to compress the spring, said torque means being arranged to shift one of said members toward the other upon displacement of the torque means in one direction out of its normal position and to shift the other of said members in the opposite direction toward the other of said members to compress said spring upon displacement of said torque means in the opposite direction out of its normal position, and means controlled according to the relative positions of said two members for controlling said brake means.

8. In combination, a rotary element, brake means for exerting a braking force on said rotary element, means subject to the torque exerted on said brake means and shiftable in one direction or the other out of a normal position depending upon the direction of rotation of the rotary element, a pair of members spaced apart, coil spring interposed between said pair of members and urging them apart, means for preventing movement of said members except toward each other in a direction to compress the spring, said torque means being arranged to shift one of said members toward the other upon displacement of the torque means in one direction out of its normal position and to shift the other of said members in the opposite direction toward the other of said members to compress said spring upon displacement of said torque means in the opposite direction out of its normal position, a Bowden wire having an outer flexible sheath fixed at one end to and movable with one of said members and an inner flexible wire fixed at one end to and movable with the other of said members whereby movement of said members toward each other is always effective to cause movement of the flexible inner wire longitudinally in one direction within the outer sheath, and means controlled by movement of the inner flexible wire for controlling the said brake means.

9. In combination, a rotary element, brake means for exerting a braking force on said rotary element, means subject to the torque exerted on said brake means and shiftable in one direction or the other out of a normal position depending upon the direction of rotation of the rotary element, a pair of members spaced apart, a coil spring interposed between said pair of members and urging them apart, means for preventing movement of said members except toward each other in a direction to compress the spring, said torque means being arranged to shift one of said members toward the other upon displacement of the torque means in one direction out of its normal position and to shift the other of said members in the opposite direction toward the other of said members to compress said spring upon displacement of said torque means in the opposite direction out of its normal position, a Bowden wire having an outer flexible sheath fixed at one end to and movable with one of said members and an inner flexible wire fixed at one end to and movable with the other of said members whereby movement of said members toward each other is aways effective to cause movement of the flexible inner wire longitudinally in one direction within the outer sheath, movable means having a normal position and shiftable different degrees out of its normal position according to a selected degree of application of the brakes, the end of the outer sheath of said Bowden wire opposite said one end being fixed to and movable with said movable means, and means controlled by movement of the flexible inner wire, partly in accordance with the position of said movable means and partly in accordance with the relative positions of the said two members, for controlling said brake means.

JOHN W. LOGAN, Jr.